(12) United States Patent
Averbuch

(10) Patent No.: US 8,601,516 B2
(45) Date of Patent: Dec. 3, 2013

(54) DVD-ENTERTAINMENT INTERACTIVE INTERNET SHOPPING SYSTEM—DEIISS

(75) Inventor: Andrei P. Averbuch, Cedar Grove, NJ (US)

(73) Assignee: Gravidi, Inc., Wellington, FL (US)

( * ) Notice: Subject to any disclaimer, the term of this patent is extended or adjusted under 35 U.S.C. 154(b) by 1214 days.

(21) Appl. No.: 10/931,389

(22) Filed: Sep. 1, 2004

(65) Prior Publication Data
US 2006/0048192 A1 Mar. 2, 2006

(51) Int. Cl.
*G06F 3/00* (2006.01)
*G06Q 30/00* (2012.01)

(52) U.S. Cl.
USPC .......................................... 725/60; 705/26.1

(58) Field of Classification Search
USPC ................................ 725/26, 60; 705/26, 26.1
See application file for complete search history.

(56) References Cited

U.S. PATENT DOCUMENTS

| | | | |
|---|---|---|---|
| 6,381,583 B1* | 4/2002 | Kenney | 705/26.8 |
| 6,526,284 B1* | 2/2003 | Sharp et al. | 455/456.6 |
| 6,901,379 B1* | 5/2005 | Balter et al. | 705/27.2 |
| 7,000,242 B1* | 2/2006 | Haber | 725/43 |
| 7,149,665 B2* | 12/2006 | Feld et al. | 703/2 |
| 2002/0049984 A1* | 4/2002 | Klappert | 725/136 |
| 2004/0044741 A1* | 3/2004 | Kelly et al. | 709/217 |
| 2005/0204398 A1* | 9/2005 | Ryal | 725/112 |

* cited by examiner

*Primary Examiner* — Nasser Goodarzi
*Assistant Examiner* — Hyun Hong
(74) *Attorney, Agent, or Firm* — Locke Lord LLP; Peter J. Fallon

(57) ABSTRACT

The current invention is a system/method that allows a user purchases products featured in the DVD content via the Internet. This invention utilizes a TV, a DVD player with its remote controller through an Internet communicating with a service provider. By using the combination of several keys of the remote controller, a user can easily view, display, select and purchase these products through Internet.

10 Claims, 4 Drawing Sheets

```xml
<?xml version="1.0" encoding="utf-8" ?>
<fpid dvd="SpiderMan2" id="124r23r21"
    metadata="metadata_spiderman2.xml">
<brand>
<name>Mattel</name>
<address>
<street>41 Tree St.</street>
<city>Newark</city>
<state>NJ</state>
<zip>05050</zip>
<url>www.matteltoys.com</url>
<email>deiissmattel@matteltoys.com</email>
<phone>313-333-3331</phone>
</address>
<product id="00210">
<price>300.98</price>
<description>Mattel Toys Spidey T-Shirt</description>
<detaileddescription>Get this fashionalble Spidey T-Shirt from Mattel Toys
    depicting their latest and greatest toy: SpiderMan Miniature! Made from
    pure imported wool form Slovakia, with no preservatives or artificial
    flavors!</detaileddescription>
<promo>20% Off</promo>
<options>
<color>red</color>
<color>green</color>
<color>white</color>
<size>S</size>
<size>M</size>
<size>L</size>
<size>LX</size>
<size>LXX</size>
</options>
<seller>matteltoys.com</seller>
<seller>wallmartonline.com</seller>
<seller>kmartonline.com</seller>
</product>
</brand>
</fpid>
```

Fig. 3

DVD-ENTERTAINMENT INTERACTIVE INTERNET SHOPPING SYSTEM—DEIISS

FIELD OF THE INVENTION

This invention relates to an Internet shopping system/method. More particularly, the invention provides an Internet shopping and digital content delivery through utilizing Internet, DVD player and TV.

BACKGROUND OF THE INVENTION

TV and DVD player become the standard household equipments and the ability to access Internet is also very common in many families. So is a digital entertainment delivery system, such as digital on-demand (DoD). In a traditional TV shopping channel, a viewer sees an item on sale on the TV screen he is interesting then he has to pick up phone and call a designated commercial center to place an order. Besides, during the commercial viewing on the fly, most time a user doesn't have enough time or information to review the showing product. Of course, Internet on-line shopping is very popular now; however, it requires a computer. So there is a need for alternative on-line shopping while not involves computer and high pressure short time viewing. Meantime, the same setup can be used as a digital content delivery system, which digital content, such as movie, music and other data can be downloaded to the requested user.

SUMMARY OF THE INVENTION

The current invention entails an alternative digital content delivery or on-line shopping system/method involving TV, DVD player, Internet. Through using a remote controller of the DVD player, the user can sign up with a service provider and receive commercial products information, which can be stored as a multilayer of overlapping content in DVD. Later on the user can retrieve the metadata layer at anytime during the DVD playback, the user either can view the downloaded digital content (movie, video or audio) or review what particular products are available for purchase. When the user is viewing the downloaded digital content, the user will access the data as he is accessing any regular DVD media. If the user is ready to do on-line shopping, the user can also pause the DVD playback, and this action also freezes the overlaying featured product metadata layer. The user can tab through visible highlighted products and with one button click, place an order using a pre-stored credit account through the internet merchant gateway, having the product shipped to a pre-stored shipping address. A user of this invention can easily interact with the system by using remote controller to select and purchase desired product.

BRIEF DESCRIPTION OF THE DRAWING

FIG. 3 is an example of using XML language to implement the Metadata structure for an available product;

DETAILED DESCRIPTION OF THE INVENTION

Figure 1:
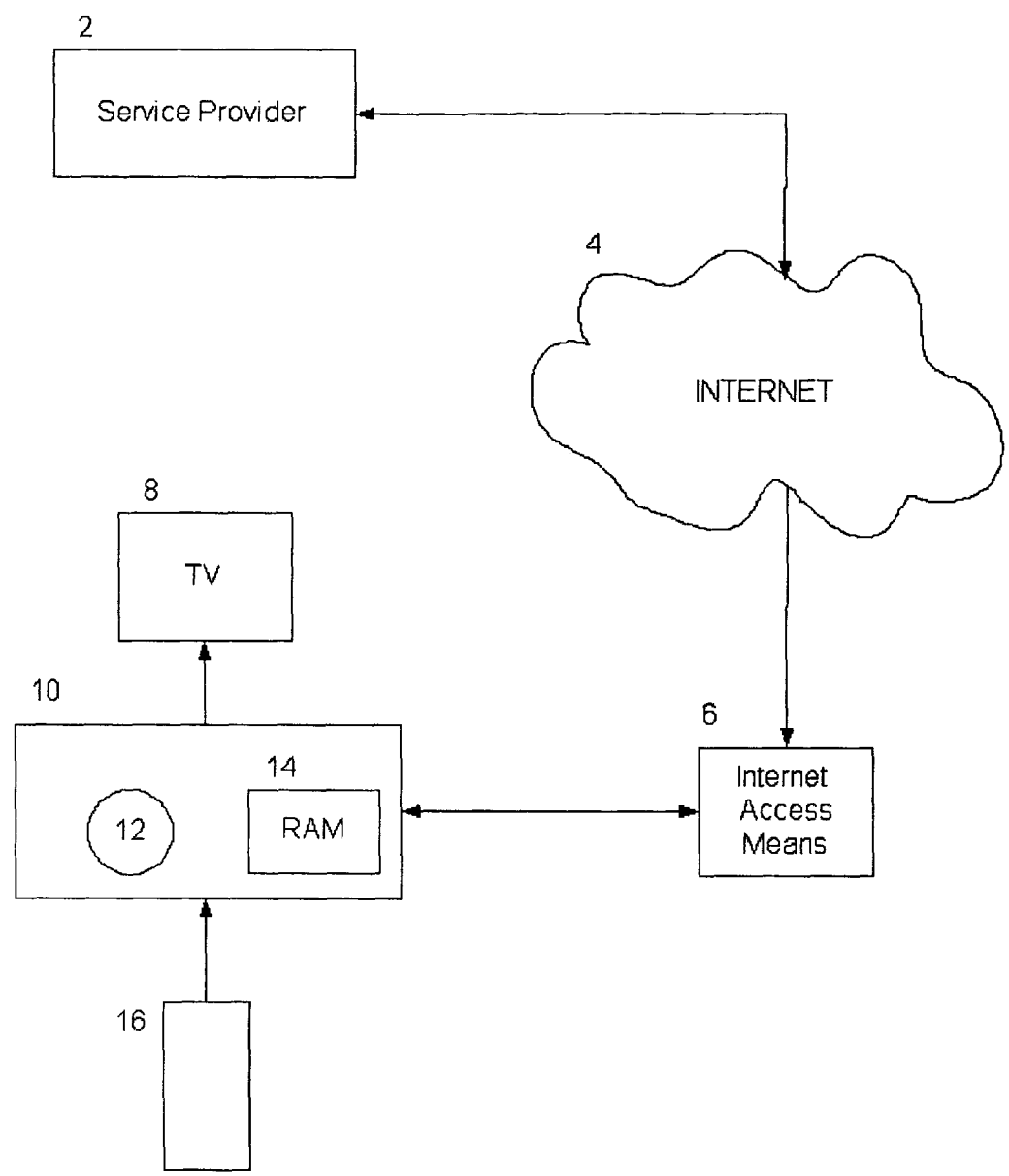
FIG. 1 is an overview of main system with major components and their relationships.

FIG. 1 illustrates the basic overall system configuration. At the end user side, includes a display device (TV/monitor) 8, a DVD player 10 with remote controller 16, DVD media 12 and an Internet access means 6, such as communicating through phone line or cable line or wireless connection. The DVD player 10 is connecting with the TV 8 in a regular way. The remote controller 16 of the DVD can transmit the user's input through infrared signal to the DVD player 10 or the TV 8. The DVD-player-TV set, which is further connecting with the service provider 2 through an Internet directly or indirectly. At the service provider side, the service provider 2 provides a merchant gateway, third party content/product feeder and DEIISS Web-subscription services.

Figure 2:
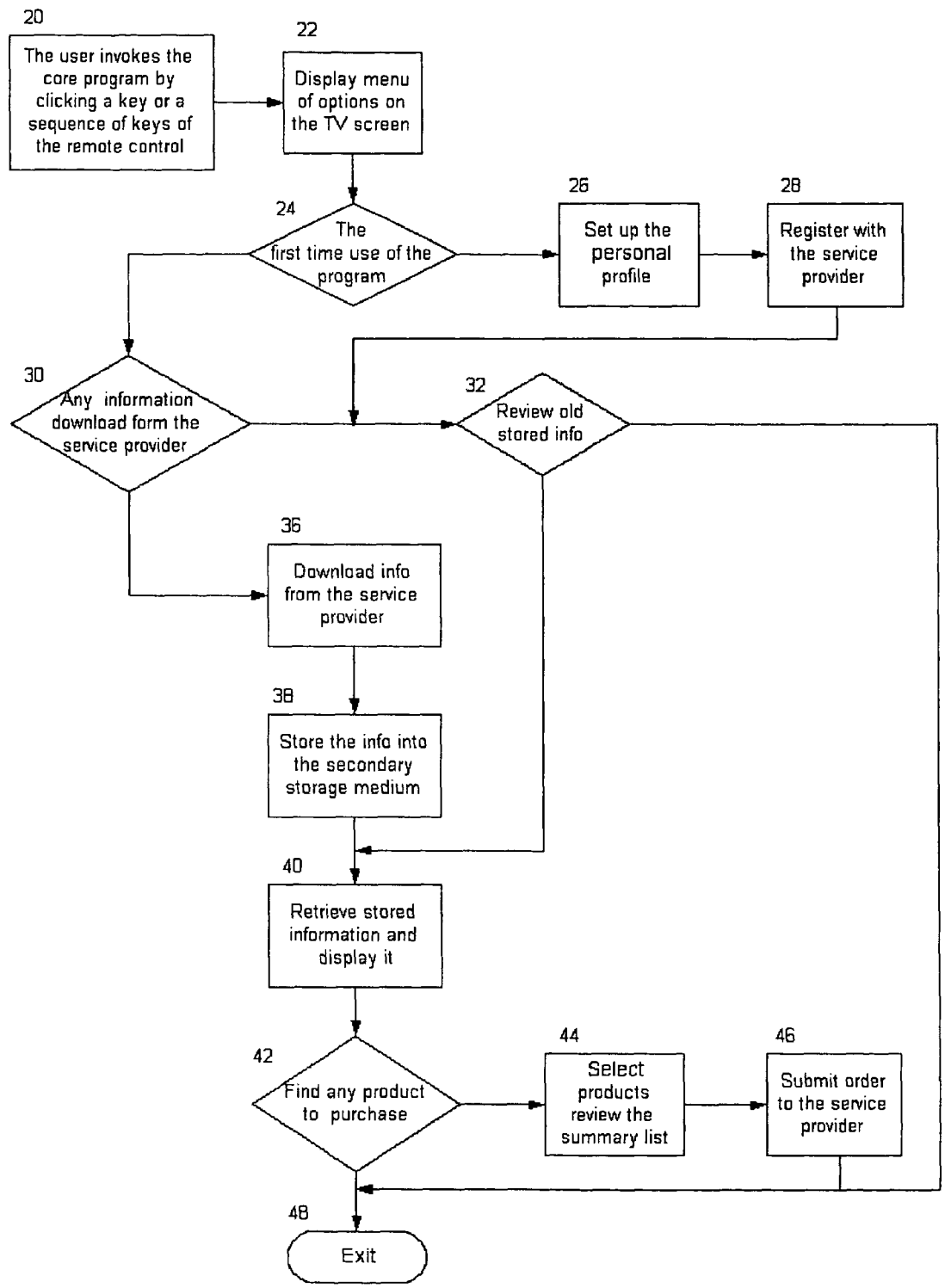
FIG. 2 is a flowchart of the ordering process.

The core program of DEIISS can be stored in the firmware of a DVD player, or stored in a DVD media 12 or downloadable from the service provider through Internet, which can be loaded into the RAM 14 of the DVD player before the program is executing. Referring FIG. 2, no matter how the program is loaded, a user can initial the program by clicking a predetermined key or a pre-determined sequence of keys of the remote controller Step 20. A menu of options will appear on the TV screen Step 22. If it is the first time the user invokes the program Step 24, the user selects one option of the menu to setup his personal profile, such as his user ID, password, credit card number and other personal information Step 26, which all information will be stored locally in a secured way. Once the user finishes the editing of his personal profile, he has the option to upload his profile to the service provider for registration purpose Step 28. The service provider, through Internet connection, can start to download catalog or other data into the User's DVD player Steps 30 and 36. These download information can be product catalogs, commercial advertisements, marketing promotions or the entertainment package(s) the user purchased, such as movie, audio data, music, or even software program. The downloadable data will be temporally stored in the RAM 14 of the DVD player and is waiting to be further stored in a proper media (a secondary store media, such as a hard disk, a DVD media, a flash memory etc.) Step 38.

DEIISS uses a the predefined format of metadata and interfaces (Product Display Layer) to define and link specific content of the video, a third party can use the DEIISS format structure to define his products and goes through the DEIISS service provider to offer its products to the end user. There are at least two file types which are used by the DEIISS software to create the Product Display Layer. First, the Metadata file would contain different markers such as timecode, which is in synch with the timecode of the DVD player. Other markers include information about specific products featured in the media content and also information about a hotspot area, which is display related information for the featured products. It includes a two-dimensional coordinates to indicate where the hotspot area will be displayed on the TV screen and a product-id. Second, the Metadata file would also contain a reference to the latest version of its related Featured Product Information Data file ("FPID"). The FPID contains Product specific data tied to the Metadata file's hotspot by product id as a key. This FPID data can include Brand Name, Price, Options and other information. Both the Metadata and FPID files can be accessed either by online download or from the DVD media itself, which could contain the Metadata and/or FPDI file on extra tracks—a fact which would make that DVD a DEIISS Compatible Disk. To be a DEIISS compatible format, the DVD must contain the FPID in synch with the content, which is stored on additional tracks of the DVD disk. The DEIISS software would create the Product Display Layer using data (text, graphics, display style information, such as font, colors, size, position etc.) from the metadata file and it associated FDIP file. The Product Display Layer would contain the hotspots created using the data from the two files. This allows a user to point to or highlight the Featured Product(s) to make a purchase selection.

All the downloadable data, the user personal profile, DEIISS software, Merchant Account Information, User profile files, FPID, and user Activity history file can be storable in digital form on a secondary storage with the proper security. The DEIISS core program will provide needed index to organize these data during storing or retrieving. For example, the FPID includes product information, such as brand name, price, availability, seller (if many) manufacturing information, reviews and options. This information can be held in the variety formats, such as a delimited text file, xml file (from online or from offsite—downloaded on demand), or a image file. All information can be stored at locally, online, or on extra tracks of a new DVD specifically supporting the DEIISS system. Moreover, if the downloaded data is in a DEIISS compatible format, the downloadable data includes an overlapping layer of metadata, it also can includes program, such as the interface routines, which describes and manipulates information about specific content existing in the video.

Upon receiving the downloaded data, the system will retrieve timecode from the DVD player which has a built-in real-time clock. Therefore, the metadata layer would contain timecode markers, which is in synch with the DVD timecode. The metadata layer would also contain related display data (text-also downloadable online, graphics, style information [font, colors, etc.]), which the metadata layer in the DVD content has two-dimensional coordinates for the product(s) to indicate where it will be displayed on the TV screen. It also allows a user through using a remote controller points to or highlights the displayed product(s) to make a selection. The downloadable data can be in the existing DVD-Video (movies) media formats or in new DEIISS compatible format. If the downloaded data is in DVD-Video format, the data will be written into the DVD media with necessary index and information, which it can be retrieved later as retrieving a movie or video data from the DVD media.

Referring back to FIG. 2, assume that the user already registered his account with the service provider, the user turns on the TV, the DVD player and connects the TV-DVD set to the Internet, the user can operate the TV-DVD set as the usual way or he can click a designated key of the remote controller, for example the "Info" key, to pause the DVD playback operation. By clicking another designated key of the remote controller, the user invokes the DEIISS core program Step 20, the program will check if any corresponding metadata existing Step 30, the program will automatically connect with the service provider through Internet to download updated metadata from there Step 30, if there is no updated metadata to be downloaded, then the system will handle the control to the regular DVD player software to run the regular DVD functions Step 32. If there is new or updated metadata to be downloaded from the service provider, it downloads the metadata into the DVD player Step 36. Meantime, the program will also check if there is new FPID, then the user can decide if he wants to view the FPID or not. Using a common remote controller of the DVD player, a user can carry out all functions of the DEIISS system. For example, by clicking a designated key of the remote controller, a menu of selections of the DEIISS will be displayed on the TV screen Step 22, where several choices, such as Manage User profile; Manage Credit card information; View purchase history; View DVD playback history; Download software update; and view 3rd parties products. Then the user can click a key or sequence of keys to select one of these options and follow the self explained description displayed on the TV screen to precede his operation.

Therefore, a user using a remote controller can retrieve the metadata layer at anytime during the DVD playback, and views all available products with their description in detail. The user can also put the DVD playback in pause mode, then tabs through these visible and highlights the products he wants. The System retrieves the relevant FPID file and the Metadata file from the storage and it compares the DVD player's timecode with the timecode of the Metadata. The system also retrieves the Hotspot (window display area) information, which contains the display information regarding to the product on the TV screen, such as the top-left correlating position and the width and high of the display window. By selectively pushing the key of the remote controller, the user goes through menu displayed inside the Hotspot and selects the item he wants to purchase, at the end; a summary of the user's selections will be displayed in the Hotspot. The user can either confirm his selections or go back to change his selections before he submits the purchase order. The order includes the product(s) he wants, his personal account information including his shipping and billing addresses. The transaction between the user and the service provider and all these stored information will be in proper encryption and security protocols. It is important that the transaction will be done using encrypted secured sockets connection between the DVD player and the merchant gateway. Hence, by clicking one or more keys, the user places an order through the Internet to the service provider.

Figure 4:
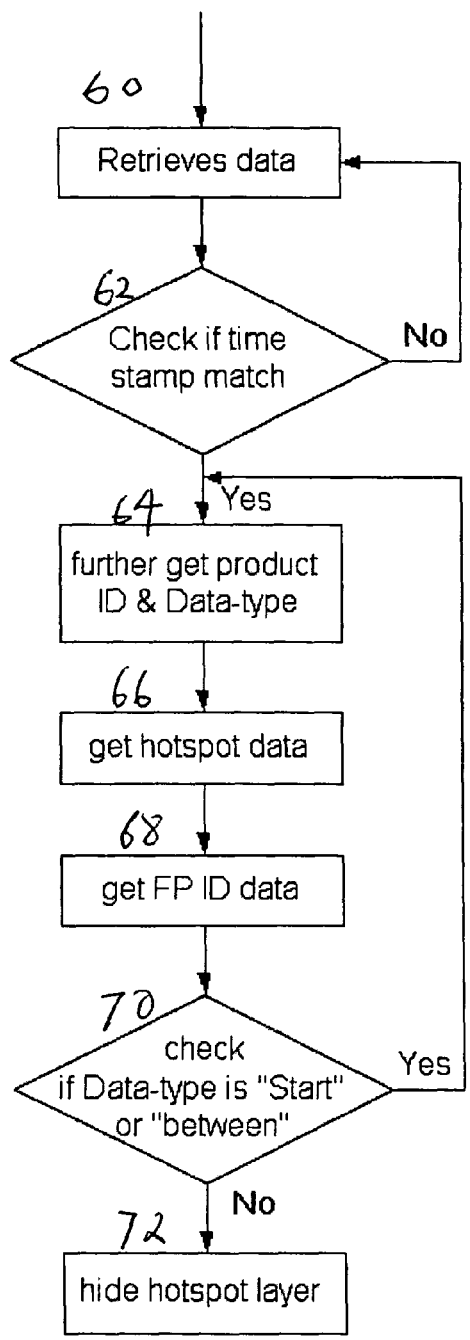
FIG. 4 shows the flowchart of data retrieve process after the user selects a product from the displayed list.

FIG. 4 illustrates the operational logical flow of DEIISS when a user picks a product form the displayed selections. The DEIISS software, based on the selection, searches the Metadata Layer and FPID files and retrieves the product's timestamp Steps 60 and 62, if the timestamp matches, then the software will get the product ID and data-type Step 64, also gets the corresponding hotspot data Step 66 and corresponding FPID data Step 68. The software further checks if the data-type is a "start" type or a "between" type Step 70, if it is, which means that there are more data associating with the current product-id and needed to be further retrieved. Then the software will go back to Step 62 and retrieves more associating information until the new retrieved data-type is an "end" type. When the data-type is an "end" then hides the hotspot layer Step 72.

Of course, the user can purchase entertainment products, such as movie, music etc., in downloadable digital format from the service provider. Once the entertainment product is downloaded, it can be stored either as the regular DVD format or in the DEIISS format. If it is stored as a regular DVD format, then the user can access it through normal DVD operation.

Furthermore, as an alternative the DVD player can have different built-in secondary store media, such as a hard driver, DVD media, extra RAM memory, to store the DVD player software, Movie metadata files, DEIISS software, Merchant Account Information, User profile files, FPID, and user Activity history file. As another alternative, some of these programs and files can be downloadable from Internet. Of course, the DEIISS software can be implemented in different programming language as long as it can perform the required functions. FIG. 3 illustrates an example of using XML language to implement the Metadata structure

What is claimed is:

1. An on-line shopping method which a user using a TV as a display device, a DVD player as a storage and program executing device and a remote controller of the DVD player as an input device, communicating through Internet with a service provider, where the method comprising the steps of: at the user side,

- a. invoking to load a core software program into the RAM of the DVD player and execute the loaded program which uses a predefined format of metadata and a product display layer to define and link product specific data from the core software program to featured products in the media content, and displays a corresponding menu of options for the user to select on the TV;
- b. having the ability, through the selection of options of the menu, to highlight a featured product in the media content with a hotspot and display associated product specific data, wherein the core software program creates the hotspot and displays the product specific data on the TV screen whenever the featured product appears in the media content utilizing the product display layer which comprises a first file type comprising the metadata that associates a data-type to a timestamp that is synchronized with a timecode of a timing device of the DVD player, a hot spot area marker identified by a two-dimensional coordinates, and a unique product-id marker, wherein said timestamp, hot spot area marker, and product-id marker are associated with the featured product, and a second file type comprising a featured product information data file containing the product specific data associated with the unique product-id marker of the first file type,
- c. having the ability, through the selection of options of the menu, to set up the user's personal profile, account information and register with the service provider;
- d. receiving product information having said timestamp from the service provider and storing the downloaded information, wherein said timestamp is synchronized with a timecode of the DVD player's timing device;
- e. retrieving and displaying the stored information, which may contain displayable menus and lists of products with their detail information;
- f. selecting highlighted product(s) with the remote controller from the media content to display the product specific data for purchasing and placing an order through Internet with the service provider, said product specific data presents as an overlay directly on the media content, at the service provider side,

- g. receiving and maintaining the information of a registered user;
- h. providing information including available products and their relevant information, displayable menu and executable software program to the log-in user; and
- i. processing the order placed by the user.

2. A method as claimed in claim 1, wherein invoking to load a core software program further comprising loading the program from ROM, RAM, an optical disk, or the service provider.

3. A method as claimed in claim 1, further comprising the steps of: c1. if the received information uses the program defined format then storing the received information with the defined format in a DVD disk and using an extra track of a DVD disk to store the format related information; and c2. otherwise, storing the received information with the DVD disk existing format.

4. A method as claimed in claim 1, wherein retrieving and displaying the stored information, which may contain displayable menus and lists of products with their detail information further comprising the steps of: d1. if the stored information is a movie or an audio piece then playing the stored information; and d2. if the stored information is a commercial available products, displaying the information according to the display format specified within the information.

5. A method as claimed in claim 1, wherein displayable menus and lists of products with their detail information further comprising product brand name, price, availability, seller, manufacturer, options and reviews.

6. A method as claimed in claim 1, wherein the media content is any regular DVD media.

7. A method as claimed in claim 1, wherein the media content is selected from the group consisting of movies, videos, audio, and combinations thereof.

8. A method as claimed in claim 1, wherein said user highlights the displayed product(s) to make a selection by pointing and using a remote controller.

9. A method as claimed in claim 1, wherein said data-type is a start, a between, or an end type.

10. A method as claimed in claim 9, further comprising the steps of: c3. retrieving associated data when said data-type is a start type or a between type; and c4. discontinuing the retrieval of associated data when said data-type is an end type.

* * * * *